US005759635A

United States Patent [19]

Logan

[11] Patent Number: 5,759,635

[45] Date of Patent: Jun. 2, 1998

[54] METHOD FOR DEPOSITING SUBSTITUTED FLUOROCARBON POLYMERIC LAYERS

[75] Inventor: Mark Andrew Logan, Pleasant Valley, N.Y.

[73] Assignee: Novellus Systems, Inc., San Jose, Calif.

[21] Appl. No.: 675,664

[22] Filed: Jul. 3, 1996

[51] Int. Cl.$^{6}$ .................................. C08J 7/18; B05D 3/14

[52] U.S. Cl. .......................... 427/490; 427/562; 427/563; 427/573; 427/255.1

[58] Field of Search .................................... 427/490, 562, 427/577, 255.1, 563, 574, 573

[56] References Cited

U.S. PATENT DOCUMENTS

| | | | |
|---|---|---|---|
| 4,557,945 | 12/1985 | Yagi et al. | 427/575 |
| 5,156,919 | 10/1992 | Brar et al. | 427/490 |
| 5,244,730 | 9/1993 | Nguyen et al. | 427/490 |
| 5,549,935 | 8/1996 | Nguyen et al. | 427/578 |

OTHER PUBLICATIONS

Teflon® AF Product Information sheet 204103B (Oct. 1992).

Teflon® AF Product Information sheet, "Processing and Use" 231577B (Oct. 1992).

Teflon® AF Product Information sheet, "Adhesion Information for TEFLON® AF" 232407B (Oct. 1992).

Teflon® AF 1601S Product Information sheet 234264A (Jan. 1993).

Teflon® AF Technical Information sheet, "Properties of Amorphous Fluoropolymers Based on 2,2-Bistrifluoromethyl-4, 5-Difluoro-1,3-Dioxole" 234435A (Dec. 1993).

Oehrlein, G., "ECR CVD of Fluorocarbon-Based Low Epsilon Dielectric" (1995).

Teflon® AF Amorphous Fluoropolymer, "A New Generation of Teflon® Fluorocarbon Resins For High Performance" H-16577-1 (Jan. 1992).

*Primary Examiner*—Shrive Beck
*Assistant Examiner*—Bret Chen
*Attorney, Agent, or Firm*—Skjerven, Morrill, MacPherson, Franklin & Friel LLP; David E. Steuber; Serge J. Hodgson

[57] ABSTRACT

In accordance with the invention, a method of depositing substituted fluorocarbon polymeric layers exhibiting a high degree of cross-linking is presented. The substituted fluorocarbon polymeric layers are formed of substituted fluorocarbon polymers in which the carbon functionality in standard fluorocarbon polymers is selectively replaced with a substitute functionality, typically silicon, oxygen or nitrogen. Formation of a substituted fluorocarbon polymeric layer includes placing a substrate into a reactor and, while maintaining the reactor pressure below 100 torr, introducing a process gas into the reactor. Optionally, the substrate is biased. The process gas is then ionized thereby depositing the substituted fluorocarbon polymeric layer on the substrate.

28 Claims, 3 Drawing Sheets

METHOD FOR DEPOSITING SUBSTITUTED FLUOROCARBON POLYMERIC LAYERS

FIELD OF THE INVENTION

This invention relates to a method of depositing material using plasma enhanced and thermal chemical vapor deposition, and more particularly to a method of depositing layers with low dielectric constants.

BACKGROUND OF THE INVENTION

In integrated circuits, dielectric layers are normally used as insulators. As semiconductor devices become faster and more complex, dielectric layer characteristics become increasingly important.

One important characteristic is the dielectric constant. The dielectric constant is a measure of the ability of a dielectric material to store electrical potential energy under the influence of an electric field measured by the ratio of the capacitance of a condenser with the material as a dielectric to its capacitance with vacuum as a dielectric, with air having a dielectric constant of approximately one.

The dielectric constant determines the capacitance associated with the dielectric layer, with low dielectric constant layers having lower capacitances. The capacitance of the dielectric layer affects the speed of the device. Devices manufactured with dielectric layers having a low dielectric constant operate at faster speeds. For example, if a 100 megahertz "PENTIUM" (registered trademark of Intel) chip is produced with a dielectric layer having a dielectric constant of 4.0, then the same chip produced with a dielectric layer having a dielectric constant of 3.5 will operate at 110 megahertz.

The capacitance of a dielectric layer also affects the power consumption of the device, with devices manufactured with low capacitance (low dielectric constant) dielectric layers consuming less power. As the art moves towards low power and low voltage applications, it becomes increasingly important to manufacture devices with layers having a low dielectric constant.

Another important characteristic is the dielectric layer's mechanical stability at elevated temperatures. High temperature stability is desired due to the stress imparted on the dielectric layer during deposition of subsequent layers. The temperatures under which these later layers are deposited can reach as high as 400 ° C. Thus, it is desirable to produce a dielectric layer which has good mechanical stability at temperatures of at least 400° C.

Another important characteristic of a dielectric layer is the ability of the layer to form a strong bond with other layers and with the substrate. Improving the ability of a dielectric layer to bond with other layers improves other aspects of the dielectric layer's performance, for example the dielectric layer's high temperature stability. Thus it is desirable to produce a dielectric layer which readily bonds with other layers.

One dielectric material which is often used to form dielectric layers is silicon dioxide. Silicon dioxide is typically selected because it has good physical and electrical properties. For example, silicon dioxide dielectric layers have good mechanical stability at elevated temperatures and typically have dielectric constants which range from 4 to 5. However, as the art moves towards faster and lower power applications, it is desirable to produce a dielectric layer with a dielectric constant of 3 or less.

Carbon fluorine polymers, generally referred to as "TEFLON" (registered trademark of Dupont), are known to have relatively low dielectric constants (One example of a carbon fluorine polymer is polytetrafluoroethylene: $((CF_2)_2)_N$ where N is large.) Because of their relatively low dielectric constants, carbon fluorine polymers are being evaluated as a dielectric for high-density and hybrid integrated circuits. (See Dupont Data Sheet, "Teflon ® AF Amorphous Fluoropolymer, A New Generation Of Teflon ® Fluorocarbon Resins For High Performance", 14 pages, 1992.) However, there are several obstacles to the use of carbon fluorine polymers in semiconductor applications. One obstacle is that the maximum temperature at which carbon fluorine polymers can be used is in the range of 200° C. to 300° C. As discussed above, dielectric layers should be able to withstand temperatures of at least 400° C.

Another obstacle to the use of carbon fluorine polymers is their poor adhesion characteristics. Carbon fluorine polymers are essentially non-polar, containing no reactive chemical functionality, and they are highly resistant to chemical attack. Thus adhesion to various substrates depends primarily on physical, rather than chemical interactions. (See e.g., Dupont, "Teflon ® AF Product Information sheet, Adhesion Information for TEFLON ® AF" 2 pages, 1992.)

Accordingly, what is desired is a dielectric layer with a low dielectric constant, which exhibits good mechanical stability at elevated temperatures and good adhesion characteristics.

SUMMARY OF THE INVENTION

In accordance with the invention, a method for depositing a substituted fluorocarbon polymeric layer exhibiting a high degree of cross-linking is presented. Substituted fluorocarbon polymeric layers according to this invention are formed of substituted fluorocarbon polymers in which the carbon functionality in standard fluorocarbon polymers is selectively replaced with a substitute functionality, typically silicon, oxygen or nitrogen. The substituted fluorocarbon polymeric layers have a high degree of cross-linking, i.e. have a high degree of attachment between chains of the substituted fluorocarbon polymers. This high degree of cross-linking enhances the mechanical strength and thermal stability of the substituted fluorocarbon polymeric layers.

In one embodiment, a substrate is placed in a plasma enhanced chemical vapor deposition (PECVD) reactor. While maintaining the reactor pressure below 100 torr, a process gas comprising a fluorocarbon containing gas component (fluorocarbon component) and a substitute functionality containing gas component (substitute component) is introduced into the reactor. The process gas is then ionized thereby depositing on the substrate a substituted fluorocarbon polymeric layer.

In accordance with this invention, the substituted fluorocarbon polymer layer deposited has a dielectric constant in the range of 2 to 4, mechanical stability at temperatures in excess of 400° C., and good adhesion characteristics.

In some embodiments, the fluorocarbon component is selected from the group consisting of hexafluoropropylene $C_3F_6$, vinylidene fluoride $C_2F_2H_2$ and tetrafluorethylene $C_2F_4$. Further, the substitute component is a material which provides a source of silicon, oxygen or nitrogen, either individually or in combination. Suitable materials which provide a source of silicon include silicon tetrafluoride $SiF_4$, silane $SiH_4$ and disilicon hexafluoride $Si_2F_6$. A suitable material which provides a source of oxygen is tetraethoxysilane $Si(C_2H_5O)_4$. Suitable materials which provide a source of nitrogen include hexamethyldisilazane $((CH_3)_3Si)_2NH$, ammonia $NH_3$ and nitrogen trifluoride $NF_3$.

In an alternative embodiment, a substrate is placed on a pedestal in a thermal chemical vapor deposition (CVD) reactor. The substrate temperature is adjusted to a temperature in the range of −20° C. to 400° C. While maintaining the reactor pressure at less than 100 torr, a process gas comprising a fluorocarbon component and a substitute component is introduced into the reactor. The process gas reacts on the surface of the substrate thereby depositing a substituted fluorocarbon polymeric layer. Optionally, the process gas can be ionized, thus enhancing the deposited substituted fluorocarbon polymeric layer.

DETAILED DESCRIPTION OF THE PREFERRED EMBODIMENTS

Substituted fluorocarbon polymeric layers according to this invention are formed of substituted fluorocarbon polymers in which the carbon functionality in standard fluorocarbon polymers is selectively replaced with a substitute functionality which typically contains silicon, oxygen or nitrogen. For example, if the standard fluorocarbon polymer is polytetrafluoroethylene, $((CF_2)_2)_N$ where N is large, then the replaced carbon functionality is $CF_2$. Further, substituted fluorocarbon polymeric layers according to this invention exhibit a high degree of cross-linking, i.e. have a high degree of attachment between chains of the substituted fluorocarbon polymers. This high degree of cross-linking enhances the mechanical strength and thermal stability of the substituted fluorocarbon polymeric layers.

Figure 1:
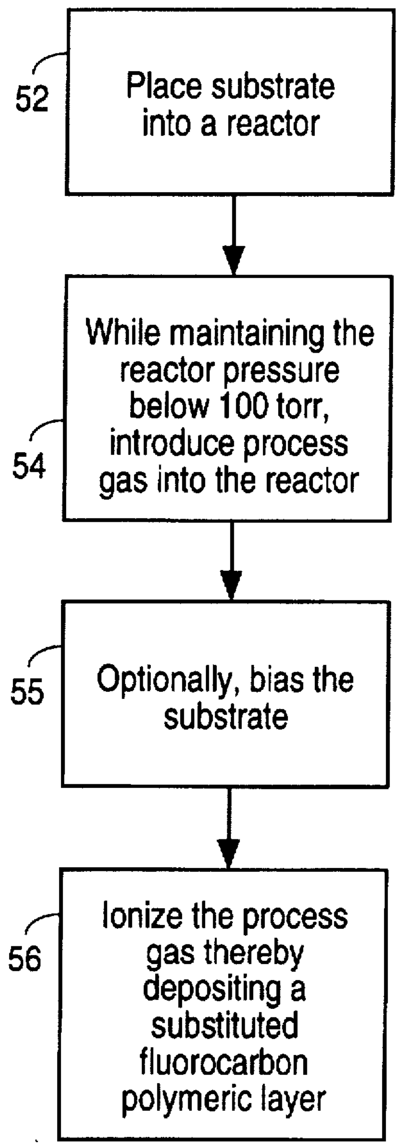
FIG. 1 is a flowchart of the primary steps involved in depositing a substituted fluorocarbon polymeric layer in accordance with an embodiment of the present invention.

Presented in FIG. 1 is a flowchart of the primary steps involved in depositing a substituted fluorocarbon polymeric layer in accordance with an embodiment of the invention. The first step in the deposition, as shown in block 52, is to place a substrate, typically a silicon wafer, on a pedestal in a reactor. The reactor is typically a plasma enhanced chemical vapor deposition (PECVD) reactor. Suitable reactors include Novellus's “CONCEPT 1” and “SPEED” reactors.

While maintaining the reactor pressure generally below 100 torr and typically in the range of 0.2 to 50 torr, a process gas is introduced into the reactor, as shown in block 54. Gas flow controllers are used to control the process gas flow into the reactor.

The process gas is typically a gas mixture which has a fluorocarbon containing gas component and a substitute functionality containing gas component (hereinafter a fluorocarbon component and a substitute component, respectively). Suitable materials for the fluorocarbon component include hexafluoropropylene $C_3F_6$ (hereinafter HFP), vinylidene fluoride $C_2F_2H_2$ (hereinafter VDF) and tetrafluorethylene $C_2F_4$ (hereinafter TFE).

The substitute component is a material which provides a source of silicon, oxygen, or nitrogen, either individually or in combination. Suitable materials which provide a source of silicon include silicon tetrafluoride $SiF_4$, silane $SiH_4$, or disilicon hexafluoride $Si_2F_6$. A suitable material which provides a source of oxygen is tetraethoxysilane $Si(C_2H_5O)_4$ (hereinafter TEOS). Suitable materials which provide a source of nitrogen include hexamethyldisilazane $((CH_3)_3Si)_2NH$ (hereinafter HMDS), ammonia $NH_3$ and nitrogen trifluoride $NF_3$.

As shown in block 55, optionally the substrate can be biased, for example by coupling radio frequency (RF) power (13.56 megahertz) to the pedestal upon which the wafer is located.

Finally, the process gas is ionized thereby depositing on the substrate a substituted fluorocarbon polymeric layer, as shown in block 56.

In accordance with this invention, the substituted fluorocarbon polymeric layer has a dielectric constant in the range of 2 to 4, mechanical stability at temperatures in excess of 400° C. and good adhesion characteristics.

In a first embodiment, the process gas is a gas mixture of HFP, VDF and silicon tetrafluoride. Silane or disilicon hexafluoride can be substituted for silicon tetrafluoride. The molecular ratio (hereinafter referred to as “ratio” unless otherwise indicated) of HFP to VDF is in the range of approximately 0.1 to 1.0 and the ratio of silicon tetrafluoride (or silane or disilicon hexafluoride) to VDF is approximately 0.1. These ratios are obtained using mass flow controllers to control the flow rates of HFP, VDF and silicon tetrafluoride (or silane or disilicon hexafluoride). For example, a flow rate of 1000 standard cubic centimeters per minute (hereinafter sccm) of VDF, 100 sccm of HFP, and 100 sccm of silicon tetrafluoride (or silane or disilicon hexafluoride) provides a gas mixture having the desired ratios, i.e. the ratio of HFP to VDF is 0.1 and the ratio of silicon tetrafluoride (or silane or disilicon hexafluoride) to VDF is 0.1.

The gas mixture is then ionized thereby depositing on the substrate a substituted fluorocarbon polymeric layer at a growth rate of approximately 2500 Å/minute. In this embodiment the resulting polymer has a general chemical composition of $(C_NSi)_xF_{2N+4}$ where N is ≧3 and x >100. This polymer is an elastomer that has good mechanical stability at high temperatures and is highly resistant to chemical degradation.

In a second embodiment, the process gas is a gas mixture of HFP, VDF and TEOS. HMDS can be substituted for TEOS. The ratio of HFP to VDF is in the range of approximately 0.1 to 1.0 and the ratio of TEOS (or HMDS) to VDF is approximately 0.1.

The gas mixture is then ionized thereby depositing on the substrate a substituted fluorocarbon polymeric layer at a growth rate of approximately 2500 Å/minute. In this second embodiment, the resulting polymer has a general chemical composition of $(CF_2)_xSiO_2F_2$ or $(CF_2)_xSi_2NF$ depending upon whether TEOS or HMDS is used, respectively, where x≧5. This polymer has a glass-like character (amorphous structure) and good mechanical stability at high temperatures.

In a third embodiment, the process gas is a mixture of HFP, VDF and ammonia. Nitrogen trifluoride can be substituted for ammonia. The ratio of HFP to VDF is in the range of approximately 0.1 to 1.0 and the ratio of ammonia (or nitrogen trifluoride) to VDF is approximately 0.1.

The gas mixture is then ionized thereby depositing a substituted fluorocarbon polymeric layer. In this third embodiment the resulting polymer has a general chemical composition of $(CF_2)_xN$ and $(CF_2)_xNH$ if ammonia is used as the nitrogen source material, and $(CF_2)_xN$ and $(CF_2)_xNF$ if nitrogen trifluoride is used as the nitrogen source material, where $x \geqq 10$. This polymer has polar nitrogen functionality which aids in surface bonding.

In a fourth embodiment, the process gas is a mixture consisting of TFE, HFP and silicon tetrafluoride. Disilicon hexafluoride can be substituted for silicon tetrafluoride. The ratio of HFP to TFE is approximately 0.1 and the ratio of silicon tetrafluoride (or disilicon hexafluoride) to TFE is also approximately 0.1.

The gas mixture is then ionized thereby depositing on the substrate a substituted fluorocarbon polymeric layer at a growth rate of approximately 2500 Å/minute. In this fourth embodiment the resulting polymer has a general chemical composition of $(C_NSi)_xF_{2N+4}$ where N is ≧3 and x>10. This polymer is an elastomer with good mechanical stability at high temperatures and is highly resistant to chemical degradation.

Figure 2:
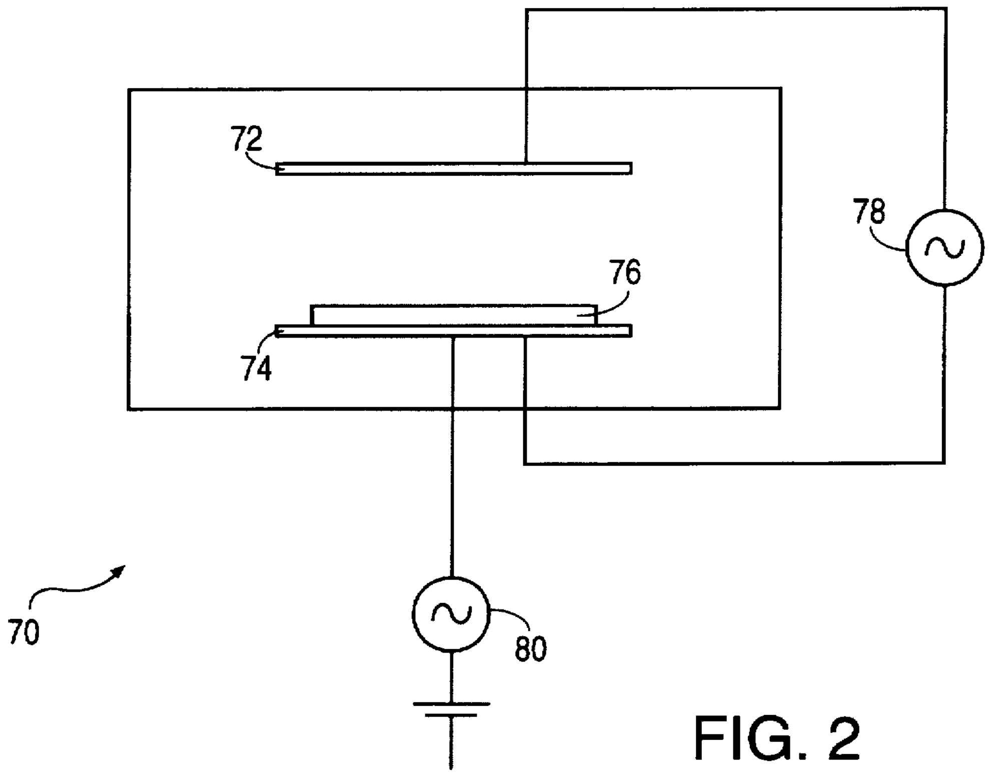
FIG. 2 is a schematic representation of a parallel plate PECVD reactor in which a substituted fluorocarbon polymeric layer is deposited in accordance with an embodiment of the present invention.

FIG. 2 is a schematic representation of a parallel plate PECVD reactor 70 in which a substituted fluorocarbon polymeric layer is deposited in accordance with one embodiment of the present invention. Reactor 70 includes a first conductive plate 72 and a second conductive plate 74 (a pedestal) upon which a substrate 76 is placed. An AC generator 78, typically an RF generator, is coupled to first and second conductive plates 72, 74.

AC power (RF power) from generator 78 is coupled to plates 72, 74. This creates a time varying electric field between plate 72 and plate 74 which, referring to block 56 of FIG. 1, ionizes the process gas. Generally, low power levels are used and, more particularly, the power density of the surface of substrate 76 is typically less than approximately 2 watts/cm$^2$. The ion density achieved is generally in the range of approximately $1\times10^8$ ions/cm$^3$ to $1\times10^9$ ions/cm$^3$.

Optionally, referring to block 55 of FIG. 1, substrate 76 can be biased by coupling AC power (RF power) from a second AC generator 80, typically an RF generator, to plate 74. This creates a net negative charge on substrate 76 (since electrons are more mobile than ions) which attracts positively charged ions to substrate 76 and enhances the characteristics of the deposited substituted fluorocarbon polymeric layer. For example, substrate 76 is biased to increase the deposition rate.

Figure 3:
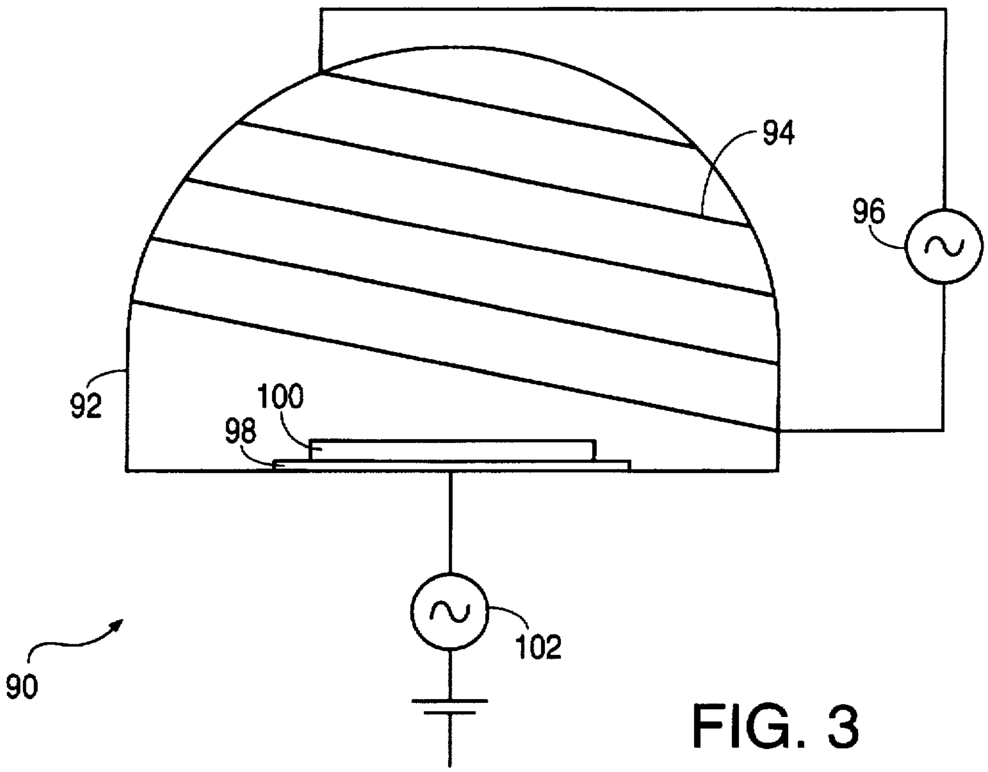
FIG. 3 is a schematic representation of an inductively couple PECVD reactor in which a substituted fluorocarbon polymeric layer is deposited in accordance with an alternative embodiment of the present invention.

FIG. 3 is a schematic representation of an inductively coupled PECVD reactor 90 in which a substituted fluorocarbon polymeric layer is deposited in accordance with an alternative embodiment of the present invention. Reactor 90 includes a hemispherical dome 92, typically made of quartz or alumina, and an inductive coil 94 wound around the outer surface of dome 92. An AC generator 96, typically an RF generator, is coupled to the first and second ends of inductive coil 94. A substrate 100 is placed on a pedestal 98 to which an AC generator 102, typically an RF generator, is coupled.

AC power (RF power) from generator 96 is coupled to inductive coil 94. This creates a time varying solenoidal electric field in reactor 90 which, referring to block 56 of FIG. 1, ionizes the process gas. Generally, lower power levels are used and, more particularly, the power density of the surface of substrate 100 is less than approximately 10 watts/cm$^2$. A high ion density is achieved in the range of $1\times10^{11}$ ions/cm$^3$ to $1\times10^{12}$ ions/cm$^3$. Optionally, AC power (RF power) can be coupled to pedestal 96 from generator 102 to bias the substrate.

In the FIG. 2 and FIG. 3 reactors, the substrate is located in the plasma. However, in alternative embodiments, a high density plasma is generated away from the substrate (a remote plasma with an ion density in the range of approximately $1\times10^{11}$ atoms/cm$^3$ to $1\times10^{12}$ atoms/cm$^3$) and ions travel from the plasma to the substrate and deposit a substituted fluorocarbon polymeric layer. Examples of high density remote plasma reactors include electron cyclotron resonance (ECR) reactors and helicon wave reactors. In some of these embodiments, the substrate is biased to enhance the extraction of ions from the plasma to the substrate.

Figure 4:
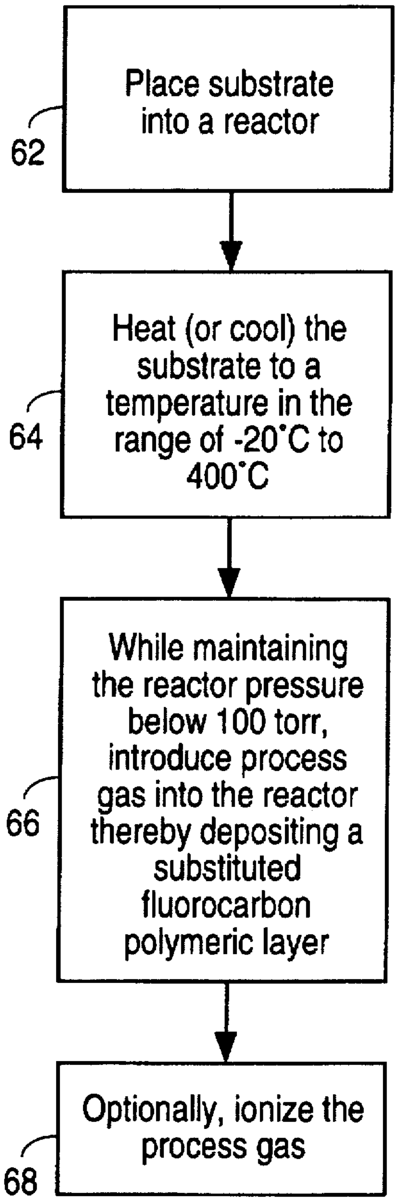
FIG. 4 is a flowchart of the primary steps involved in depositing a substituted fluorocarbon polymeric layer in accordance with an alternative embodiment of the present invention.

Presented in FIG. 4 is a flowchart of the primary steps involved in depositing a substituted fluorocarbon polymeric layer in accordance with another embodiment of the invention. The first step in the deposition, as shown in block 62, is to place a substrate, typically a silicon wafer, on a pedestal in a reactor. The reactor is typically a thermal CVD reactor.

As shown in block 64, the substrate is heated (or cooled) using conventional techniques to a temperature in the range of −20° C. to 400° C.

While maintaining the substrate temperature from block 64 and the reactor pressure below 100 torr, process gas is introduced into the reactor, as shown in block 66. The process gas reacts on the surface of the substrate thereby depositing a substituted fluorocarbon polymeric layer. For example, the process gas can be one of the gas mixtures as described in the four embodiments above.

Optionally, as shown in block 68, the process gas can be ionized. The process gas is ionized to enhance the deposition of the substituted fluorocarbon polymeric layer, for example to increase the deposition rate.

While my invention has been described with respect to the embodiments and variations set forth above, these embodiments and variations are illustrative and I do not necessarily consider my invention to be limited in scope to these embodiments and variations. Accordingly, other embodiments and variations not described herein may be considered within the scope of my invention as defined by one or more of the following claims.

I claim:

1. A method of depositing a substituted fluorocarbon polymeric layer comprising the steps of:

placing a substrate in a reactor;

introducing a first gas mixture comprising a fluorocarbon containing gas and a substitute functionality containing gas into said reactor while maintaining a pressure in said reactor at less than or equal to 100 torr; and ionizing said first gas mixture thereby depositing said substituted fluorocarbon polymeric layer on said substrate.

2. The method of claim 1 wherein said pressure in said reactor is in the range of 0.2 to 50 torr.

3. The method of claim 1 wherein said fluorocarbon containing gas is selected from the group consisting of hexafluoropropylene (HFP), vinylidene fluoride (VDF) and tetrafluorethylene (TFE).

4. The method of claim 1 wherein said substitute functionality containing gas provides a source of silicon.

5. The method of claim 4 wherein said substitute functionality containing gas is selected from the group consisting of silicon tetrafluoride, silane and disilicon hexafluoride.

6. The method of claim 1 wherein said substitute functionality containing gas provides a source of oxygen.

7. The method of claim 6 wherein said substitute functionality containing gas is tetraethoxysilane.

8. The method of claim 1 wherein said substitute functionality containing gas provides a source of nitrogen.

9. The method of claim 8 wherein said substitute functionality containing gas is selected from the group consisting of hexamethyldisilazane (HMDS), ammonia and nitrogen trifluoride.

10. The method of claim 1 wherein said fluorocarbon containing gas is a second gas mixture comprising hexafluoropropylene (HFP) and vinylidene fluoride (VDF) and wherein said substitute functionality containing gas is selected from the group consisting of silicon tetrafluoride, silane and disilicon hexafluoride.

11. The method of claim 10 wherein a molecular ratio in said first gas mixture of said HFP to said VDF is in the range of approximately 0.1 to 1.0 and wherein a molecular ratio in said first gas mixture of said substitute functionality containing gas to said VDF is approximately 0.1.

12. The method of claim 10 wherein said substituted fluorocarbon polymeric layer is formed of polymers which have a chemical composition of $(C_NSi)_xF_{2N+4}$ where N is ≧3 and x>100.

13. The method of claim 1 wherein said fluorocarbon containing gas is a second gas mixture comprising hexafluoropropylene (HFP) and vinylidene fluoride (VDF) and wherein said substitute functionality containing gas is selected from the group consisting of tetraethoxysilane (TEOS) and hexamethyldisilazane (HMDS).

14. The method of claim 13 wherein a molecular ratio in said first gas mixture of said HFP to said VDF is in the range of approximately 0.1 to 1.0 and wherein a molecular ratio in said first gas mixture of said substitute functionality containing gas to said VDF is approximately 0.1.

15. The method of claim 13 wherein said substituted fluorocarbon polymeric layer is formed of polymers which have a chemical composition of $(CF_2)_xSiO_2F_2$ if said substitute functionality containing gas is TEOS and $(CF_2)_xSi_2NF$ if said substitute functionality containing gas is HMDS, where x≧5.

16. The method of claim 1 wherein said fluorocarbon containing gas is a second gas mixture comprising hexafluoropropylene (HFP) and vinylidene fluoride (VDF) and wherein said substitute functionality containing gas is selected from the group consisting of ammonia and nitrogen trifluoride.

17. The method of claim 16 wherein a molecular ratio in said first gas mixture of said HFP to said VDF is in the range of approximately 0.1 to 1.0 and wherein a molecular ratio in said first gas mixture of said substitute functionality containing gas to said VDF is approximately 0.1.

18. The method of claim 16 wherein said substituted fluorocarbon polymeric layer is formed of polymers which have a chemical composition of $(CF_2)_xN$ and $(CF_2)_xNH$ if said substitute functionality containing gas is ammonia and $(CF_2)_xN$ and $(CF_2)_xNF$ if said substitute functionality containing gas is nitrogen trifluoride, where x≧10.

19. The method of claim 1 wherein said fluorocarbon containing gas is a second gas mixture comprising tetrafluorethylene (TFE) and hexafluoropropylene (HFP) and wherein said substitute functionality containing gas is selected from the group consisting of silicon tetrafluoride and disilicon hexafluoride.

20. The method of claim 19 wherein a molecular ratio in said first gas mixture of said HFP to said TFE is approximately 0.1 and wherein a molecular ratio in said first gas mixture of said substitute functionality containing gas to said TFE is approximately 0.1.

21. The method of claim 19 wherein said substituted fluorocarbon polymeric layer is formed of polymers which have a chemical composition of $(C_NSi)_xF_{2N+4}$ where N is ≧3 and x>10.

22. The method of claim 1 wherein said step of ionizing further comprises the step of coupling RF power to said reactor.

23. The method of claim 22 wherein a power density on said substrate is less than approximately 2 watts/cm$^2$.

24. The method of claim 1 wherein said reactor is a parallel plate plasma-enhanced chemical vapor deposition (PECVD) reactor.

25. The method of claim 1 wherein said reactor is an inductively coupled plasma-enhanced chemical vapor deposition (PECVD) reactor.

26. The method of claim 1 wherein said step of ionizing said first gas mixture creates a plasma, said plasma being remote from said substrate.

27. A method of depositing a substituted fluorocarbon polymeric layer comprising the steps of:

placing a substrate in a reactor;

adjusting a temperature of said substrate to be in the range of −20° C. to 400° C.; and introducing a gas mixture comprising a fluorocarbon containing gas and a substitute functionality containing gas into said reactor while maintaining a pressure in said reactor at less than or equal to 100 torr thereby depositing said substituted fluorocarbon polymeric layer on said substrate.

28. The method of claim 27 further comprising the step of ionizing said gas mixture.

* * * * *